US011336990B2

(12) United States Patent
Moudgill et al.

(10) Patent No.: US 11,336,990 B2
(45) Date of Patent: *May 17, 2022

(54) DECORATIVE WIRELESS COMMUNICATION SYSTEM AND MODULE THEREOF

(71) Applicant: PERIPHERII INC., Chappaqua, NY (US)

(72) Inventors: Priti Moudgill, Chappaqua, NY (US); Sonal Budhiraja, Palo Alto, CA (US)

(73) Assignee: Peripherii Inc., Chappaqua, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,591

(22) Filed: Mar. 1, 2021

(65) Prior Publication Data
US 2021/0185422 A1 Jun. 17, 2021

Related U.S. Application Data

(63) Continuation of application No. 15/751,356, filed as application No. PCT/US2016/052401 on Sep. 18, 2016, now Pat. No. 10,939,194.

(60) Provisional application No. 62/305,029, filed on Mar. 8, 2016, provisional application No. 62/220,979, filed on Sep. 19, 2015.

(51) Int. Cl.
*H04R 1/10* (2006.01)
*H04W 76/10* (2018.01)
*H04R 1/02* (2006.01)
*H04W 4/80* (2018.01)

(52) U.S. Cl.
CPC .......... *H04R 1/105* (2013.01); *H04R 1/1016* (2013.01); *H04R 1/1075* (2013.01); *H04W 76/10* (2018.02); *H04R 1/028* (2013.01); *H04R 1/1025* (2013.01); *H04R 1/1041* (2013.01); *H04R 1/1066* (2013.01); *H04R 2201/023* (2013.01); *H04R 2201/107* (2013.01); *H04R 2201/109* (2013.01); *H04R 2420/07* (2013.01); *H04W 4/80* (2018.02)

(58) Field of Classification Search
CPC .... H04R 1/105; H04R 1/1016; H04R 1/1075; H04R 1/028; H04R 1/1025; H04R 1/1041; H04R 1/1066; H04R 2201/023; H04R 2201/107; H04R 2201/109; H04R 2420/07; H04W 76/10; H04W 4/80
USPC .................................................. 381/74, 333
See application file for complete search history.

(56) References Cited

U.S. PATENT DOCUMENTS

| D176,512 S | 1/1956 | Hagedorn |
| 4,803,853 A | 2/1989 | Hoerkens |

(Continued)

*Primary Examiner* — Ammar T Hamid
(74) *Attorney, Agent, or Firm* — Zhong Law, LLC

(57) ABSTRACT

A wireless communication device that is capable of being fixed to a decorative piece, including a housing body comprising a first shell piece and a second piece, wherein the first shell piece and the second shell piece, when coupled together, define a first space volume, a second space volume, and a pathway connecting the first space volume and the second space volume, a speaker circuit arranged in the first space volume, an electronic circuit arranged in the second space volume, wherein the electronic circuit is electrically connected to the speaker circuit, and an activation circuit electrically connected to the electronic circuit, wherein an activation of the activation circuit operatively connects the speaker circuit with the electronic circuit.

19 Claims, 11 Drawing Sheets

(56) References Cited

U.S. PATENT DOCUMENTS

| | | |
|---|---|---|
| 7,536,150 B2 | 5/2009 | Ryann |
| 8,676,274 B2 | 3/2014 | Li |
| 9,084,054 B2 | 7/2015 | Prelogar et al. |
| 10,939,194 B2 * | 3/2021 | Moudgill .............. H04R 1/1016 |
| 2008/0311966 A1 * | 12/2008 | Klein ................... H04R 1/1025 |
| | | 455/575.2 |

* cited by examiner

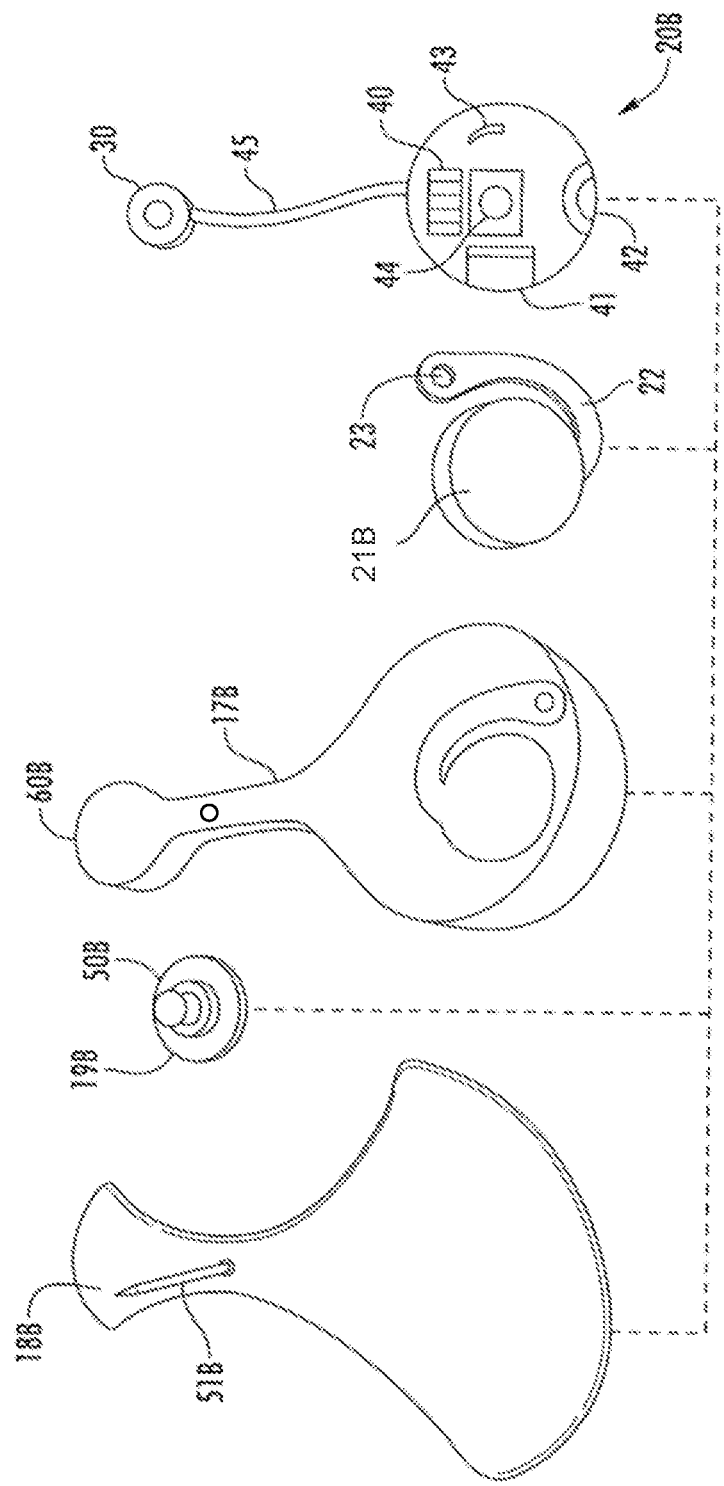

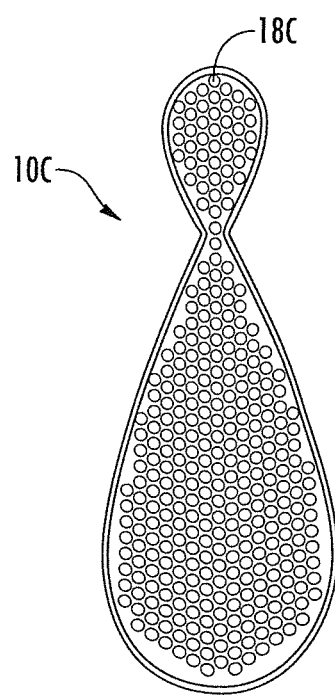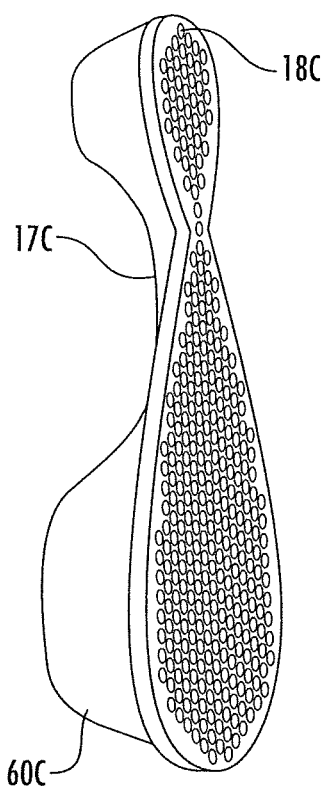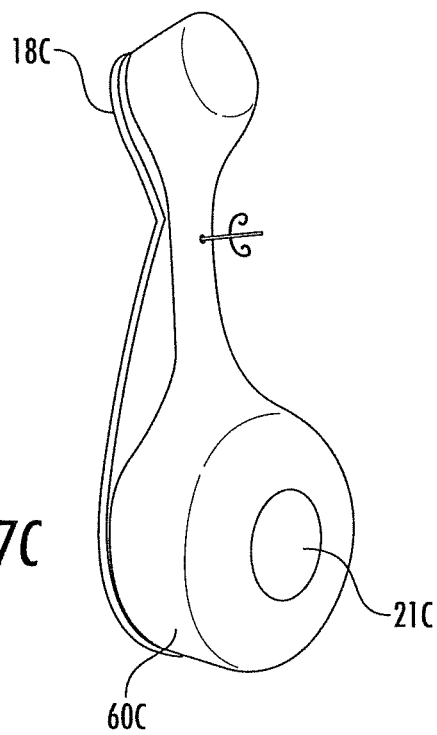
FIG. 7A
FIG. 7B
FIG. 7C

DECORATIVE WIRELESS COMMUNICATION SYSTEM AND MODULE THEREOF

CROSS REFERENCE TO RELATED APPLICATIONS

This application is a continuation of U.S. patent application Ser. No. 15/751,356 filed Feb. 8, 2018, which is the U.S. national stage entry of International Patent Application No. PCT/US2016/052401 filed Sep. 18, 2016, which claims priority from U.S. Prov. Ser. No. 62/220,979 filed Sep. 19, 2015 and U.S. Prov. Ser. No. 62/305,029 filed Mar. 8, 2016, the entire contents of each of which are incorporated by reference in their entireties.

FIELD OF THE INVENTION

The present invention relates to a decorative communication system. More particularly, the present invention provides a decorative communication system communicating with a hand held device and a wearable decorative communication module containing a speaker, activation components, microphone, enabling operative use without a hand-held device and with decorative options there in.

BACKGROUND

Conventional communication devices such as cellular phones and ear-buds or headphones assist in making and receiving phone calls, addressing recreational or wellness/health oriented services and improving related tracking. Conventional communication devices can include a cellular transceiver, as well as Wi-Fi, and NFC (Near-Field Communication) transceivers operating known protocols and circuits such as BLUETOOTH®. Unfortunately, such conventional devices can intrude in an unhelpful manner during use via loud sounds, lights, vibrations, etc. which directly impact a user and those around her. Each of these conventional communication devices have a poor aesthetic appearance and are visually intrusive to users.

Conventionally existing are designs for wired as well as wireless headset-earrings. Most of these prior art headset-earrings have one or more shortcomings that the device of this patent overcomes.

U.S. Pat. No. 9,084,054 titled "Ear Jewelry with Wireless Audio Device" provides a headset apparatus in which the audio device extends through the piercing in the wearer's ear, with the signal path passing through the piercing of the ear itself from a wireless communications device at the first end to the sound production unit at the opposite end. The part of the earring (the post) that extends through the piercing is a weak hollow cylinder intended to house a helically wrapped conductor. Since most earring posts are made of very narrow gauge wire, a tube is very uncomfortable for most wearers. Additionally, the speaker that extends towards the ear canal has an intrusive appearance and thus fails the a need for being attractive and "disappearable" from the direct attention of an observer during a use. Overall, the design of this device does not allow for comfort, flexibility of wear, or a strong aesthetic appeal.

In U.S. Pat. No. 7,536,150 titled "Wireless Earring Assembly", Ryann describes a wireless headset that has a unit that attaches to the ear lobe in the manner of an earring. The idea is to avoid burdening the ear with the weight of electronic components. However, this device too fails a "disappearable" test and is clearly visible as a telecommunication product. It clearly looks like a piece of technology.

U.S. Pat. No. D176,512 by Anthony Hagedorn titled "Combined Earring and Hearing Aid Housing" shows a container for a hearing aid that looks like, and hangs like a earring from the earlobe. It has limited amount of technology (as hearing aid only).

U.S. Pat. No. 4,803,853 by Reiner Hoerkens titled "Ornamental ear insert and hearing aid" is just an ornamental covering for a hearing aid.

In U.S. Pat. No. 8,676,274 titled "Devices, systems, and methods for notification of events on a wireless communication device" the inventor describes a system of wireless alerts. The system only alerts the user without providing critical information or offering more functionality. A user, cannot speak through the earring circuit during operation. There is no provision for using the earring as a voice-based user interface.

An additional unfortunate occurrence in the conventional art is that all current headphones fit into three types, namely; (i) over-ear-style (big cups that include an outer ear), (ii) on-ear-types (smaller structures that sit on top of an ear, and (iii) directly inserted in-ear-types (inserted into an ear canal such as 'earbuds'). Each of these conventional systems has detriments to use and to appearance and convenience.

There are a number of drawbacks to the conventional headphones, including; (i) wearing headsets in social situations is consider a faux pas, (ii) current headsets are easily dislodged and displaced, and (iii) current headsets are uncomfortable to wear for extended periods.

Accordingly, there is a need for an improved system, apparatus, and kit that addresses at least one of the concerns noted herein.

ASPECTS AND SUMMARY OF THE INVENTION

The present invention provides a system, apparatus, and kit for wireless "smart" earring securely affixed to a user during a use containing a microphone, speaker, power source, and communication circuits in a compact and attractive form and is fully operative for telecommunication. A housing includes a securing jewelry post or other mechanism for fixably removably securing the proposed invention to a use during a use. Optional decorative applications or containers are used to conceal electronic structures and securely affix to a user for reliable wireless communication.

It will be understood that another aspect of the present invention is to provide a system and structure that approximates where a user holds a speaker of a common cord-linked phone or a common cellular or cordless phone or cellular so that it hovers over an ear canal region and is secured to the user's body in a reliable and visually attractive manner.

The present invention provides an electronic 'smart' telecommunication earring having at least two major elements—an electronics element that contains the electronic components that permit the device to function as a headset, and a decorative element that make the device function also as a piece of jewelry. The electronics elements may contain all the electronics necessary for an operative handset, including microphone, speaker, wireless communication circuits (such as Bluetooth®), power supply circuits and storage battery, and charging circuits (such as a charger connection or induction circuits), as well as provisions for means for physical interactions such as a button, swipe, accelerometer, and eccentric motor or other vibration generating circuit. These modules can be designed to be completely enclosed and sealed, thereby allowing these units to be manufactured and tested with reasonable surety.

The decorative elements is readily fixably attachable by any suitable means, such as soldering, threaded fasteners, snap-closures, or other structures that allow an end customer to interchange decorative elements and to additionally secure the entire device to the user using features and elements noted herein.

In another aspect of the present invention, the modules will be substantially hidden from external view. The module will be mounted to a back portion an a preexisting earring or shaped integral with the appearance of an earring so that in most cases the module with not be visible to someone facing the wearer. As a result, it is another aspect of the present invention, that in one aspect, the exterior of the module itself is highly decorative by the use of metal or a high quality plastic or resin exterior or other decoration. In this optional case, the module can function as the decorative element as well, and the module to become a piece of smart jewelry with relatively few modifications.

The module is provided in a self-contained manner with few additional connections. Possible main connections that may be available, including: (i) a wired communication port and circuit, such as a micro-USB port (permitting alternate communication channel to the wireless communication port or useful for secure communication or for higher bandwidth communication), (ii) a charging port or circuit, such as a pin-charger ore induction charging circuit (so as to recharge an integrated battery. A charging port can be combined with the communication port), (iii) an optional connector for an inductive charging coil (while it is possible to build an inductive coil into the module, inductive coils work better as the available surface area increases, and thus, it may be an improvement to use a larger exterior coil, optionally integrated with the decorative element, and a module that is designed to support exterior coils will have a standardized connector to which the coils will be connected); (iv) an internal integrated or external antenna for a wireless data and audio communication (such as a Bluetooth® circuit, or for extended range or for communication at lower frequencies, it may be desirable to use a separate external antenna provided with a standardized connector to which the antenna will be connected); (v) a physical interaction circuit or button or rocker switch and manipulated directly by the user which may be concealed as a decorative element (such as a gemstone on the front face of the earring) or to be a separate element (such as a drop element that can be pulled or squeezed), so instead of building it into the module, there is a connector by which the signals generated by the physical interaction means (button, tapping, swiping, nodding motion) are communicated to the electronics, and the use of appropriate sensors such as accelerometers will allow for such input control.

In another aspect of the present invention, there is provided a wearable device jewelry that functions as a headset and, in addition, works as an alert/notification device as optional wellness-related sensors such a pedometer, skin temperature sensor, and skin-blood-oxygen sensors. It also allows for touch, gesture as well as a voice-controlled user interface.

In another aspect of the present invention the wearable jewelry is an earring or a pair of earrings or a pendant or a lavalier style pendant or ear hook that communicates with and includes circuits to control a wireless communication device such as a smart phone. Additionally, the proposed inventions can be used separately or collectively (for example creating their own personal area network to communicate with each other and the smart phone). Either touch or sound or gestures may be used to control the communication device. A user can make phone calls, play music, dictate a note, relative to a cellular smart phone etc. all via the wearable device without having to physically access the smartphone. Likewise, alerts can be sent from the smartphone to the wearable device in response to received emails, text messages, low battery notifications, lost signal, phone calls, etc. In case of the earring(s), the notifications may be whispered into the user's ear. Alternatively or additionally, the signal could be in the form of physical or visual stimulation such as a vibration and/or a flashing light. The user can then choose to act or to ignore the alert with courtesy and discretion. The wearable device can also be used to send other reminders and alerts to the user such as calendar reminders or notifications from a host of applications such as Facebook®, Twitter®, email, etc. The wearable jewelry of this device also allows the wearer to manipulate their wireless communication device via voice commands to their wearable device in conjunction with intelligent personal assistants such as Siri® on iPhones® and Cortana® on Windows® phones.

According to one alternative embodiment of the present invention, there is provided a decorative wireless communication system, comprising: a decorative communication transport module, the decorative communication transport module: further comprising: a top hollow container spaced from a bottom hollow container by a bounded communication pathway, a decorative cover extending relative to the first hollow container and the second hollow container along the communication pathway, a fixing system proximate the communication pathway operative to releasably secure the wireless communication module system to an external user during a use, an electronic circuit module within the bottom hollow container, a speaker circuit module within the top hollow container, an electronic connection wire extending along the communication pathway between the electronic circuit module and the speaker module, and an activation circuit on the electronic circuit module, whereby during the use, an activation of the activation circuit operatively connects the speaker circuit module with the electronic circuit module.

According to one alternative embodiment of the present invention, there is provided a decorative wireless communication system, further comprising: an elongate housing supporting the top hollow container spaced from the bottom hollow container by the bounded communication pathway, and the decorative cover surface on the elongate housing closing the top and the bottom hollow containers.

According to one alternative embodiment of the present invention, there is provided a decorative wireless communication system, wherein: the decorative cover includes a plurality of projecting securing members projecting therefrom, the elongate housing further includes a plurality of engagement members shaped to communicate with respective the ones of the projecting securing members, whereby during an assembly of the a decorative communication transport module the decorative cover is securely engageable with the elongate housing, thereby securing the speaker circuit module within the top hollow container and the electronic circuit module within the bottom hollow container.

According to one alternative embodiment of the present invention, there is provided a decorative wireless communication system, wherein: the electronic circuit module further comprises: a rechargeable power supply, a data and charging port, a microphone circuit, a wireless transmitter circuit, and the activation circuit, the activation circuit including an activation trigger selected from a group consisting of a button circuit, an accelerometer circuit, and a swipe-contact circuit.

According to one alternative embodiment of the present invention, there is provided a decorative wireless communication system, further comprising: a button opening bounded on a surface of the bottom hollow container opposite the decorative cover surface, a button cover member springably secured to the bottom hollow container and having an exposed face projecting within the button opening, and the button cover member further comprising an arcuate shaped spring arm and a fixing portion joined to the bottom hollow container, thereby enabling an urging position of the button cover proximate the button opening during the use.

According to one alternative embodiment of the present invention, there is provided a decorative wireless communication system, wherein: the fixing system extends from the elongate housing away from the decorative cover surface. According to one alternative embodiment of the present invention, there is provided a decorative wireless communication system, wherein: the fixing system further comprises an adjustment system operable to adjustably reposition a projecting elongate pin to a plurality of positions between the top hollow container and the bottom hollow container.

According to one alternative embodiment of the present invention, there is provided a decorative wireless communication system, wherein: the fixing system extends from the decorative cover surface and through the communication pathway on the elongate housing between the top hollow container and the bottom hollow container.

According to one alternative embodiment of the present invention, there is provided a decorative wireless communication system, wherein: the elongate housing further comprises a plurality of support posts extending from the bottom hollow container and positioned to support the electronic circuit module during the use.

According to one alternative embodiment of the present invention, there is provided a decorative wireless communication system, wherein: the decorative cover supports the top hollow container spaced from the bottom hollow container by the bounded communication pathway, and the top hollow container, the bounded communication pathway, and the bottom hollow container extending from the decorative cover, and an elongate housing on the decorative cover and covering the top hollow container, the bottom hollow container and the bounded communication pathway.

According to one alternative embodiment of the present invention, there is provided a decorative wireless communication system, wherein: the elongate housing includes a plurality of projecting securing members projecting therefrom, and the decorative cover further includes a plurality of engagement members shaped to communicate with respective the ones of the projecting securing members, whereby during an assembly of the a decorative communication transport module the decorative cover is securely engageable with the elongate housing, thereby securing the speaker circuit module within the top hollow container and the electronic circuit module within the bottom hollow container.

According to one alternative embodiment of the present invention, there is provided a decorative wireless communication system, further comprising: a button opening bounded on a surface of the elongate housing member opposite the decorative cover surface, a button cover member springably secured to the elongate housing member proximate the bottom hollow container and having an exposed face projecting within the button opening, and the button cover member further comprising an arcuate shaped spring arm and a fixing portion joined to the elongate housing member, thereby enabling an urging position of the button cover proximate the button opening during the use.

According to one alternative embodiment of the present invention, there is provided a decorative wireless communication system, wherein: the fixing system extends from the elongate housing away from the decorative cover surface.

According to one alternative embodiment of the present invention, there is provided a decorative wireless communication system, wherein: the fixing system further comprises an adjustment system operable to adjustably reposition a projecting elongate pin to a plurality of positions spaced between the top hollow container and the bottom hollow container.

According to one alternative embodiment of the present invention, there is provided a decorative wireless communication system, wherein: the fixing system extends from the decorative cover surface and through the communication pathway between the top hollow container and the bottom hollow container and through the on the elongate housing.

According to one alternative embodiment of the present invention, there is provided a decorative wireless communication system, wherein: the electronic circuit module further comprises: a rechargeable power supply, a data and charging port, a microphone circuit, a wireless transmitter circuit, and the activation circuit, and the activation circuit including an activation trigger selected from a group consisting of a button circuit, an accelerometer circuit, and a swipe-contact circuit.

According to one alternative embodiment of the present invention, there is provided a decorative wireless communication system, further comprising: a button opening bounded on a surface of the decorative cover surface opposite the elongate housing member, a button cover member springably secured to the decorative cover surface proximate the button hollow container and having an exposed face projecting within the button opening, and the button cover member further comprising an arcuate shaped spring arm and a fixing portion joined to the decorative cover surface, thereby enabling an urging position of the button cover proximate the button opening during the use.

According to one alternative embodiment of the present invention, there is provided a decorative wireless communication system, wherein: the fixing system extends from the elongate housing away from the decorative cover surface.

According to one alternative embodiment of the present invention, there is provided a decorative wireless communication system, wherein: the top hollow container and the bottom hollow container are at least one of aligned with each other along a common plan and not aligned with each other along a common plane.

According to one alternative embodiment of the present invention, there is provided a decorative wireless communication system, wherein: at least one of the elongate housing member and the decorative cover surface extend in an curvilinear form.

According to one alternative embodiment of the present invention, there is provided a decorative wireless communication system, further comprising: a wireless telecommunication device operative to connect with a remote telecommunication network.

According to one alternative embodiment of the present invention, there is provided a decorative wireless communication system, wherein: the fixing system includes an arcuate loop spring member and a grasping hook member, the grasping hook member operative to securely engage the decorative communication transport module, whereby during the use the arcuate loop spring springably engages the use in a reliable securement.

According to one alternative embodiment of the present invention, there is provided a decorative wireless communication system, further comprising: a container case formed for operatively enclosing the decorative communication transport module.

According to one alternative embodiment of the present invention, there is provided a decorative wireless communication system, wherein: the top hollow container is flexibly connected to the bottom hollow container, thereby allowing a relative pivot motion between the top hollow container and the bottom hollow container.

According to one alternative embodiment of the present invention, there is provided a decorative wireless communication system, wherein: the decorative cover surface is removably replaceable from the decorative communication transport module, thereby allowing the user to replaceably select the decorative surface cover from a plurality thereof.

The above and other aspects, features and advantages of the present invention will become apparent from the following description read in conjunction with the accompanying drawings, in which like reference numerals designate the same elements.

BRIEF DESCRIPTION OF THE DRAWINGS

FIGS. 6A through 6E are an alternative embodiment of a decorative communication transport module.

FIGS. 7A through 7D are another alternative embodiment of a decorative communication transport module.

DETAILED DESCRIPTION OF THE PREFERRED EMBODIMENTS

Figure 1:
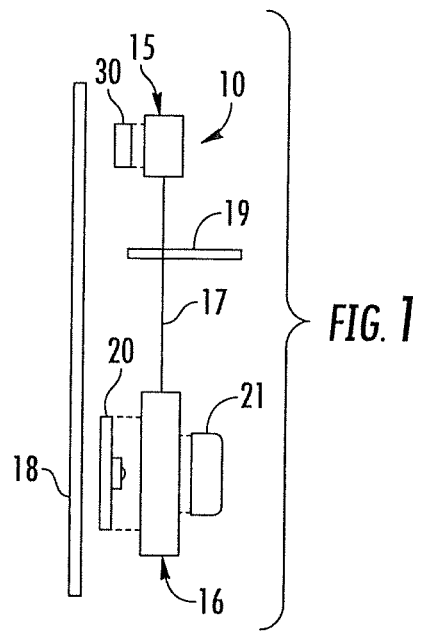
FIG. 1 is an illustrative component-view of a decorative communication transport module.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Referring now to FIGS. 1 through 5, a decorative communication system 1 includes an exemplary decorative communication transport module 10, operatively communicating with a wireless device 700 capable of operative interaction with a wireless telecommunications network illustrated by antenna 800. Exemplary decorative communication transport module 10 is noted in FIG. 1 in a partial exploded view and an exemplary decorative communication transport module 10A is noted in FIGS. 2, 3, 4, and 5 as will be discussed.

Referring now to FIG. 1, transport module 10 operatively contains, as main components a top hollow container 15 spaced from a bottom hollow container 16 by a communication pathway 17 therebetween for protecting communicating wires connecting top and bottom hollow containers 15, 16. A decorative cover surface 18 is secured to and conceals top and bottom hollow containers 15, 16 as will be discussed. Decorative cover surface 18 may be formed in any shape without limitation and may additionally be positioned and designed as discussed herein and without limitation. A fixing system 19 is provided for releasably securing transport module 10 to a user of decorative communication system 1. As noted in FIGS. 1 to 5, fixing system 19 is formed as an earring pin and backing member 19A, thereby engaging transport module 10, 10A to a user's ear 70.

As noted in FIGS. 1 and 2, bottom hollow container 16, 16A contains additional elements including an electronics circuit module 20 having a button thereon and electronic features as will be discussed, and a button cover 21. A speaker circuit module 30 is positioned in top hollow container 15, 15A, and wires (shown later) connect electronic circuit module 20 with speaker circuit module 30 along communication pathway 17.

It will be understood that wireless communication device 700 and decorative communication transport modules 10, 10A are capable of wireless communication therebetween using known technology systems such as BLUETOOTH®, but are not limited thereto. Similarly, wireless communication device 70, here depicted as a cellular phone having a communication screen 710 with a display and operational menu is capable of wireless communication from itself to wireless telecommunication network 800 using recognized wireless communication protocols.

For operative use, and as will be illustrated in later figures, electronic circuit module 20, may be provided with a rechargeable power supply (or battery) 40, a combined charging and data port 41, a microphone circuit 42, a wireless transmitter and antenna 43, and an activation circuit 44. Speaker circuit module 30 is connected by wires 45.

Figure 2:
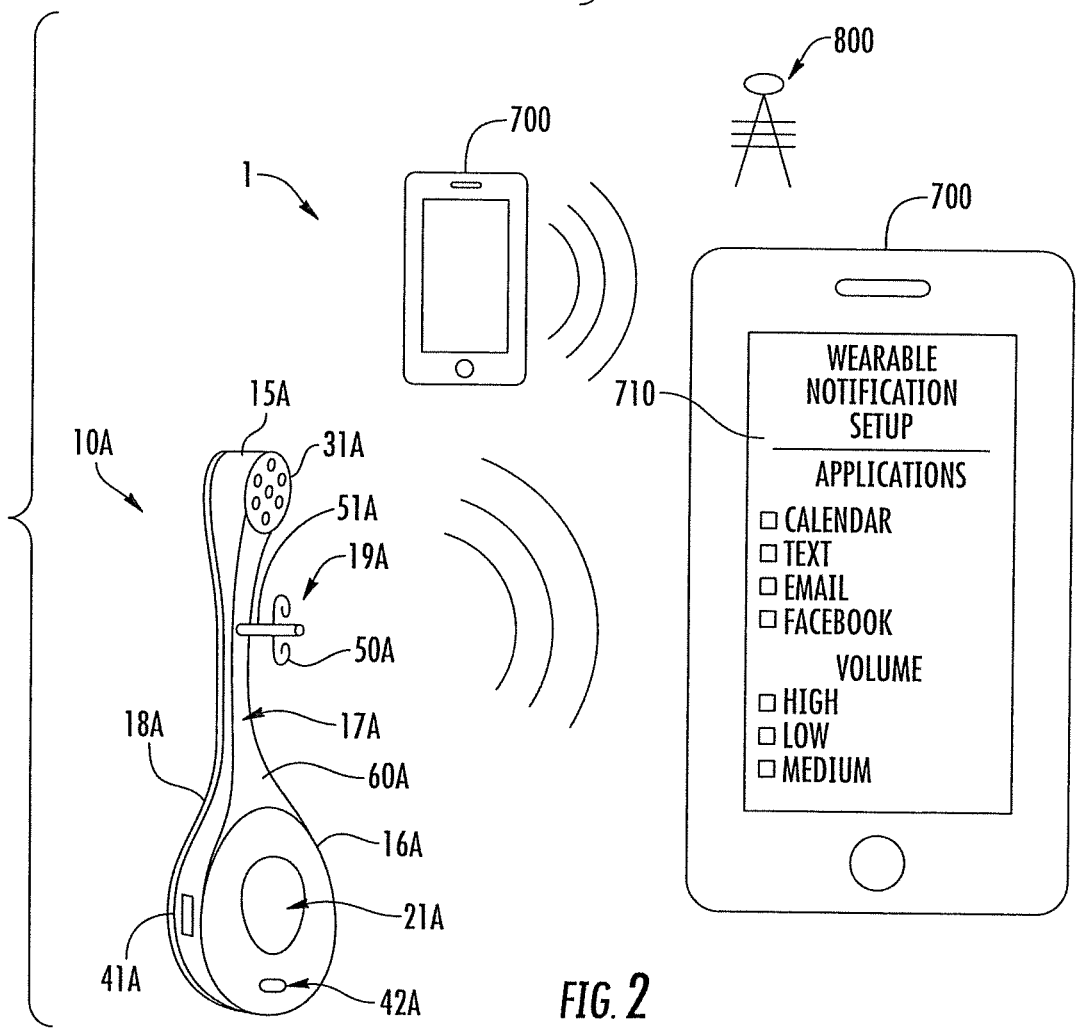
FIG. 2 is an illustrative element view of a decorative telecommunication system including a decorative communication transport module and a wireless device and wireless telecommunication network.

In FIG. 2, an exemplary elongate housing 60A is provided with decorative cover surface 18A. Elongate housing 60 is formed with top and bottom hollow containers 15A, 16A for storing the components noted herein. An outer surface of bottom hollow container 16A contains a charging data access portal 41A (such as to receive a USB interface) as an opening aligned with data and charging port 41 (shown later) on electronic circuit module 20 for charging use. It is noted that in FIG. 2, inside thereof, is a corresponding electronic circuit module 20A (not shown). Additionally, on an outer surface of bottom hollow container 16A is a microphone portal 42A that provides a communication path to the interior electronic circuit module (not shown) and the microphone circuit 42 thereon. In this manner, a user (not shown) may wear decorative communication transport modules 10, 10A, 10B, etc., as discussed herein, while speaking. Speaker circuit module 30, connected by wires 45 to electronic circuit module emits sound via perforations 31A.

Figure 3:
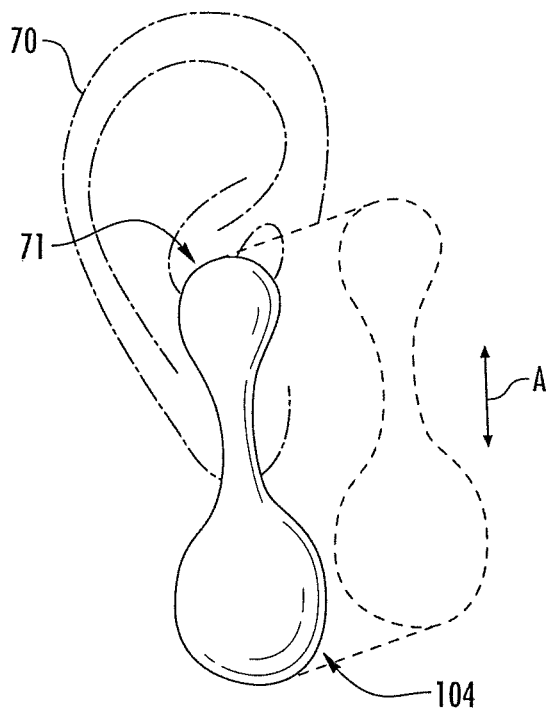
FIG. 3 is an illustrative view of a decorative communication transport module positioned and adjustable relative to a user's ear.
Figure 4:
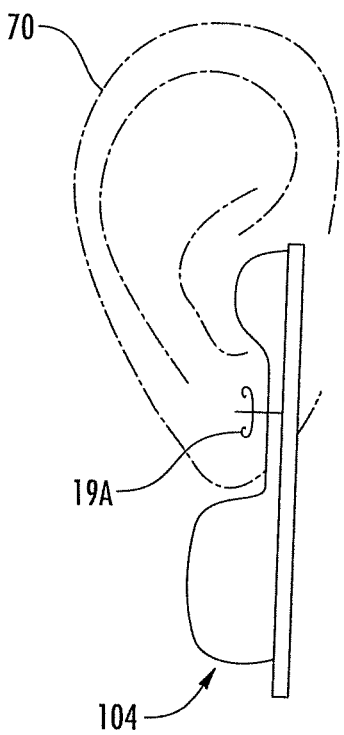
FIG. 4 is a side view of a decorative communication transport module.
Figure 5:
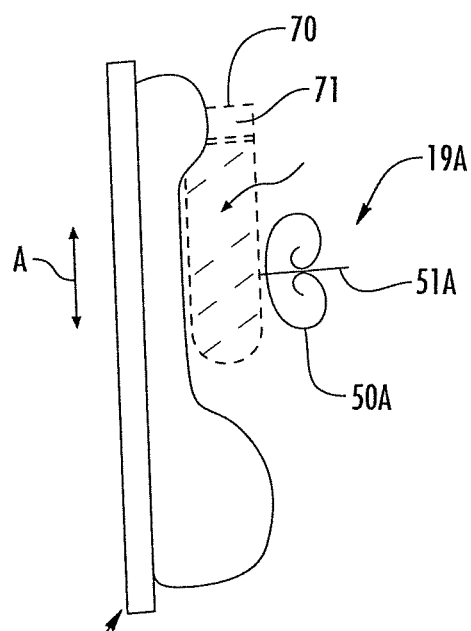
FIG. 5 is a close up side view of a secured decorative communication transport module.

As will be noted in FIG. 3A, fixing system 19, shown in FIGS. 2-5 as fixing system 19A is in the form of an elongate pin 51A having a backing 50A, wherein the pin is inserted through an earlobe portion and secured. As will be understood, the position of fixing system 19 along decorative communication transport module 10, 10A etc. may be moved along the elongate communication pathway 17, 17A, or positioned on bottom hollow container so as to allow movement of decorative communication transport modules 10 relative to ear 70 as shown by motion indicator A, As a result, it will be recognized that the present decorative communication transport module may be positioned with decorative ease and convenient use to locate speaker circuit module 30 and top hollow container 15, 15A, etc. relative to a user's ear canal 71 for listening ease.

The present decorative telecommunication system 1 having decorative communication transport module 10 may be illustrated in a number of alternative embodiments and constructions without departing from the scope and spirit of the present invention.

Figure 6A:
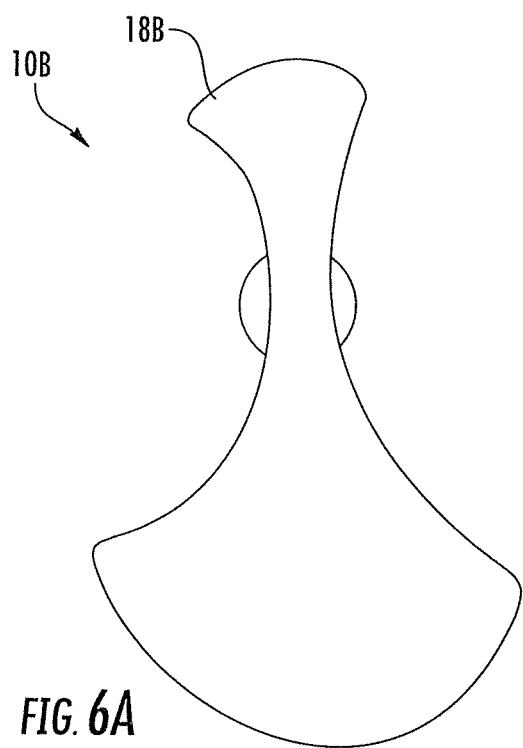
Figure 6B:
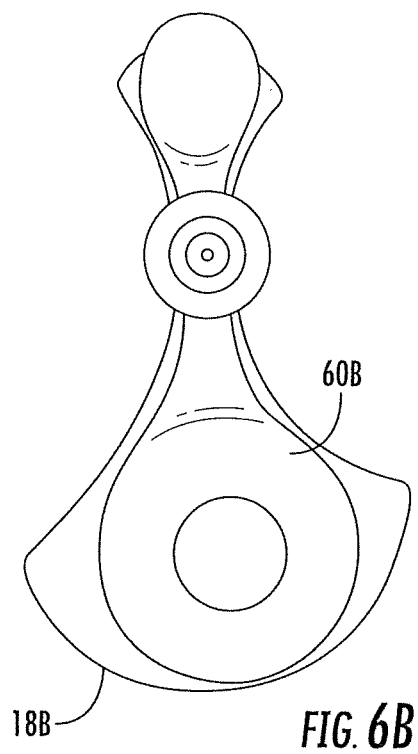
Figure 6C:
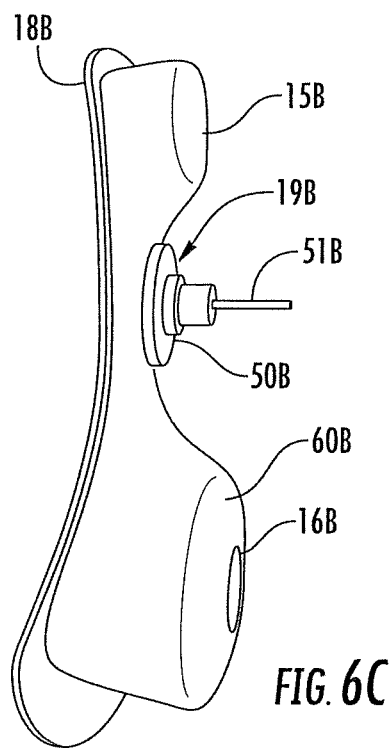
Figure 6D:
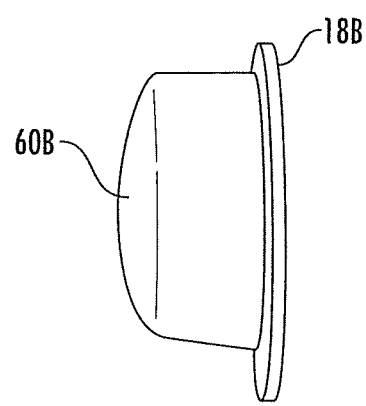
Figure 7D:
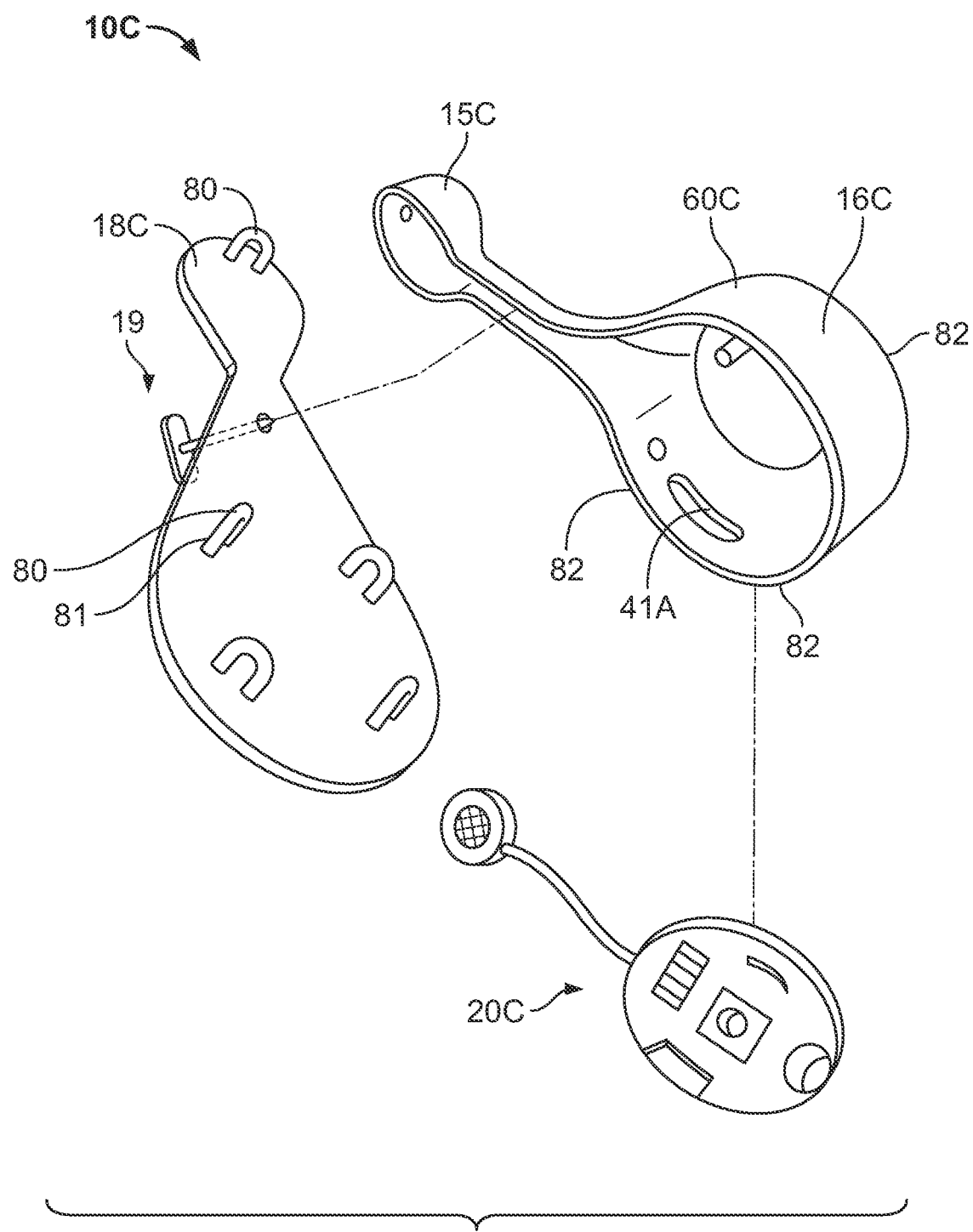

Referring now to FIGS. 6A-6E, an alternative embodiment of a decorative communication transport module 10B is shown having a decorative cover surface 18B and an elongate housing 60B is provided defining a top hollow container 15B and a bottom hollow container 16B spaced by a communication pathway 17B. A fixing system 19B is provided with a backing 50B bounding an elongate pin 51B. As noted herein decorative cover surface 18B completely covers elongate housing 60B. Additionally, a button cover 21B is provided with a spring arm 22 and a fixing hole 23 for securing button cover 21B to bottom hollow container 16B as shown in FIG. 6E allowing spring-resistant motion for engagement of activation circuit (button) 44 on electronic circuit module 20B. As noted earlier, electronic circuit module 30B contains operative rechargeable power supply 40 (battery), data charging portion 41 (USB access), microphone circuit 42 for pick up and relay of vocal data, wires 45, and wireless transmitter 43 for wireless (BLUETOOTH® type) communication. As is noted in the end view of FIG. 6D the open side of elongate housing 60B is directly secured to the decorative cover surface 18B by a form of adhesive. While not shown in FIGS. 6A to 6E, bottom hollow container 16B additionally contains the data portal and microphone portal as discussed herein, and top hollow container 15B contains perforations to allow sound to escape from speaker circuit module 30.

Additionally referring now to FIGS. 7A to 7D, a further alternative embodiment is provided for a decorative communication transport module 10C having a decorative cover surface 18C and an elongate housing 60C for containing an electronic circuit module 20C as shown relative to a fixing system 19. As noted herein, decorative cover surface 18C additionally contains securing legs 80 projecting therefrom, each leg 80 containing a respective leg opening 81 for a snap engagement with respective wall nubs 82 protruding inwardly from the wall surface of elongate housing 60C. Additionally, in the wall of bottom hollow contour 16C is shown the data portal 41A (opening) and the button cover 21C.

Figure 8:
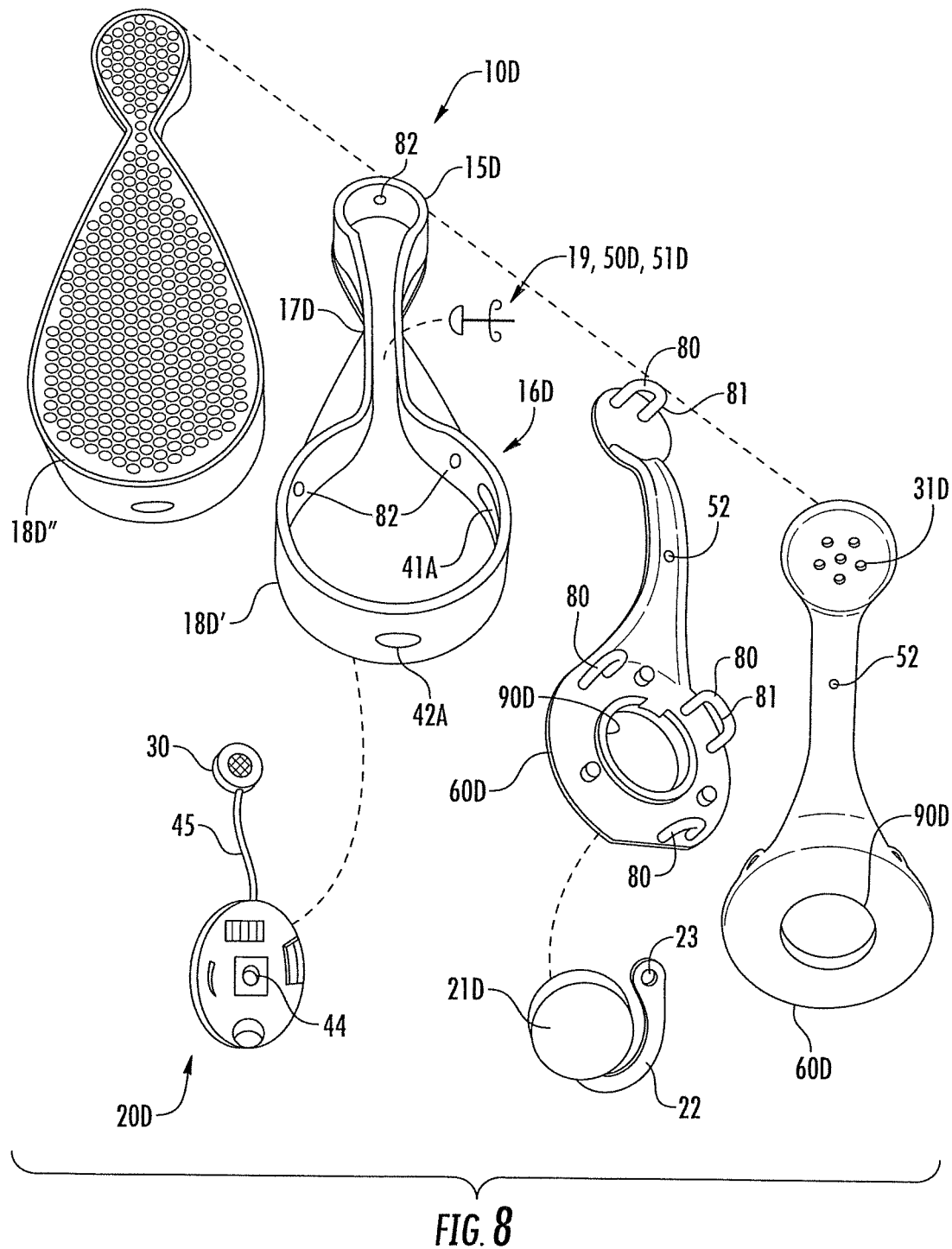
FIG. 8 is an exploded perspective view of alternative embodiment of a decorative communication transport module.

Referring now to the exploded illustrative view in FIG. 8, an alternative decorative communication transport module 10D is provided in a modified form, wherein a decorative cover surface is instead a decorative cover member 18D' having a decorative cover surface 18D" wherein decorative cover member 18D' defines a top hollow container 15D and a bottom hollow container 16D via extending side walls (as shown) extending from decorative cover surface 18D" and defining a communication pathway 17 for receiving a fixing system 17D, here provided with a backing 50D and an elongate pin 51D, and a hole 52 is defined in elongate housing 60D (similarly following the theme in FIG. 1, but operating in an inverted manner in this embodiment. In this manner, it will be understood that the general construction of the prior modules 10A, 10B, and 10C is generally inverted while maintaining the common arrangements initially discussed in FIG. 1 with decorative communication transport module 10. Along an inner wall of bottom hollow container 16D and top hollow container 15D are shown the inwardly extending wall nubs 82 positioned to engage with securing legs 80 and respective leg openings 81. It will be understood throughout this discussion that securing legs 80 have a spring-type action to elastically snap-fit over respective wall nubs 82 during assembly.

As noted in FIG. 8, decorative cover member 18D' in bottom hollow contour is shaped to receive an electronic circuit module 20D extending from a circuit support (shown, e.g., a printed circuit board (PCB)) along wires 45 to speaker circuit module 30. It is noted that electronic circuit module 20D similarly includes the noted rechargeable power supply 40, data and charging port 41, microphone circuit 42, wireless transmitter 43, activation circuit 44 (button) and other features for operative use. Similarly, bottom hollow container 16D also retains microphone portal 42A and data portal 41A.

In this embodiment, elongate housing 60D is now serving a covering role for decorative cover member 18D' and is formed in an arcuate manner with a button opening 90D (as shown) and perforations 31D. Button cover 21D is slidably received within button opening 90D and the side walls 61 (shown) of button opening 90D to allow slidable movement. Button cover 21D includes spring arm 22 and fixing hole 23. A plurality of support posts 100 extend from elongate housing 60D and support electronic circuit module 20D in a suitable position and a gap 91 in side walls 91 allows arm 22 to fit therethrough so that one of support posts 100 extends through hole 23 to secure button cover 21D in button hole 90D so as to cover activation circuit 44 during an assembly and to allow transfer of activation pressure to activation circuit 44 (which contains an activation button (shown)). Wires 44 extend along communication pathway 17D. Therefore, in assembly decorative cover member 18D' is assembled with electronic circuit module 20D and button cover 21D and elongate housing 60D to form decorative communication transport module.

Figure 9:
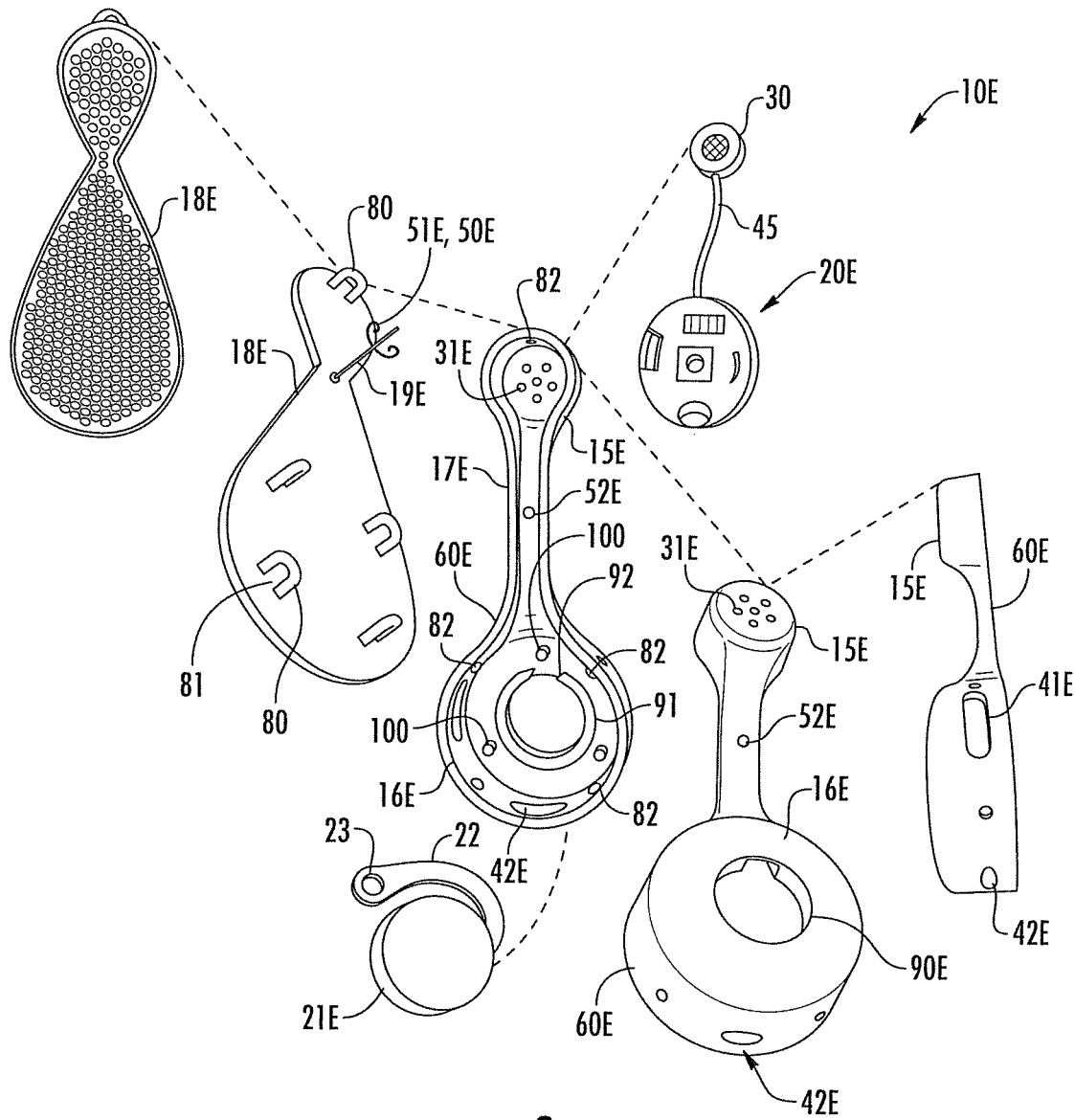
FIG. 9 is another exploded perspective view of alternative embodiment of a decorative communication transport module.

Referring now to FIG. 9 wish is a partial exploded perspective view of another decorative communication transport module 10E wherein a decorative cover surface 18E contains decorative indicia on an outer surface (shown) and a plurality of securing legs 80 extending therefrom for spring engagement with wall nubs 82 of an elongate housing 60E. Elongate housing 60E includes a top hollow container 15E spaced along a communication pathway 17E from a bottom hollow container 16E defining a button opening 90E having side walls 91, with a gap 92 for engaging a spring arm 22 of a button cover 22E. Support posts 100 extend from an inner surface of elongate housing 60D for supporting electronic circuit module 20E having wires 45 connecting speaker circuit module 30.

Wires 45 are communicated within communication pathway 17E. Perforations 21E allow sound to escape from speaker circuit module 30 during a user. As noted a data portal 41E and a microphone portal 42E are positioned through the extending wall of bottom hollow container 16E. Decorative communication transport module 10E is assembled as noted herein so that electronic circuit module is supported on support posts 100, while also fixing hole 23 is placed over one of the support posts 100 via gap 92 in side walls 91 of button opening 90E, allowing a sliding spring movement. It will additionally be understood that a fixing system 19E is provided with an elongate pin 51E and backing 50E and extend through an opening 52E in a portion of elongate housing 60E. As noted herein, there is a protective securing shroud 42B surrounding extending inwardly from the sidewall of bottom hollow container 16E proximate microphone portal 42A so as to securely maintain microphone circuit 42 on electronic circuit module in a reliable position during use.

Figure 10:
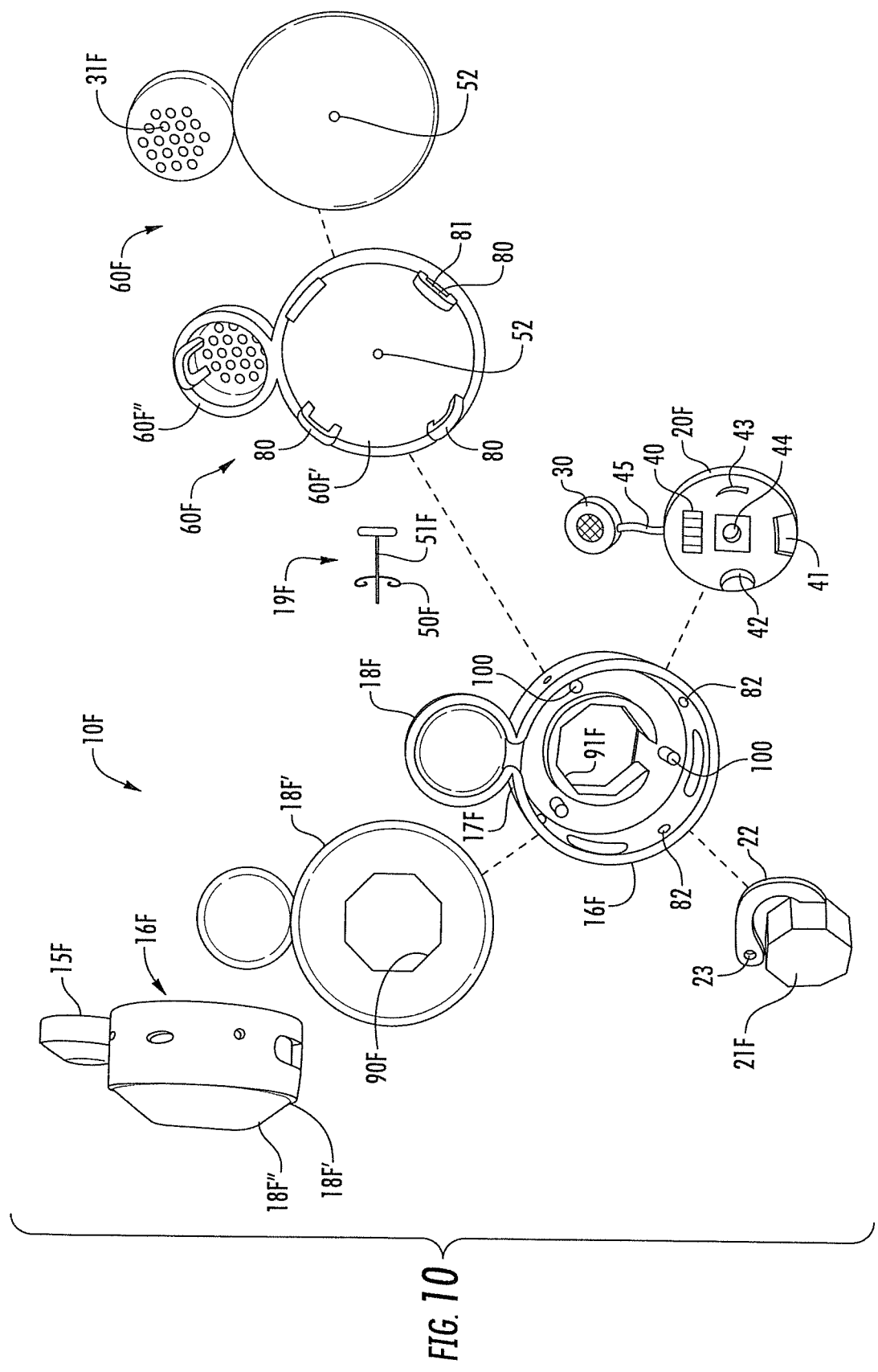
FIG. 10 is another exploded perspective view of alternative embodiment of a decorative communication transport module.

Referring now to FIG. 10 an alternative embodiment of a short bodied decorative communication transport element 10F wherein, and similar to FIG. 8, a decorative cover member 18F' includes a decorative cover surface 18F" here shown with facets on the outer decorative cover surface 18F" and on an inner side a continuous extending side wall forming a top hollow container 15F and a bottom hollow container 16F. An elongate housing 60F is provided as a cover member as shown with a flattened bottom portion 60F' containing a hole 52 on an outer surface thereof for receipt of an elongate pin 51F of a fixing system 19F and with a backing 50F. Elongate housing 60F contains flat bottom portion 60F' and a concave top portion 60F" which contains perforations 31F, as shown. A plurality of extending securing legs 80 extend from flattened bottom portion as shown, each extending securing leg 80 containing a leg opening 81 for engagement with corresponding wall nubs 82 projecting inwardly from the side wall of bottom hollow container 16F.

Decorative cover member 18F' with bottom hollow container 16F has a bottom portion (shown) with a button opening 90F, having side walls 91F, with a gap 92F therethrough for engaging spring arm 22 of a button cover 21F shaped to be slidably received within button opening 90F. A plurality of support posts 100 extend upwardly from the inner surface of bottom hollow container 16F for support of electronic circuit module 30F, and additionally for extending through and engaging fixing hole 23 of spring arm 22 to allow a spring action of button cover 21F. A communication pathway 17F is a narrow channel between bottom hollow container 16F and top hollow container 15F allowing the position of wires 45 and connection between speaker circuit module 30, and the functional elements noted on electronic circuit module 20s herein; namely a rechargeable power supply 40, data and charging port 41, microphone circuit 42, and wireless transmitter 43 and activation circuit 44 provided with a button member engaging with button cover 21F to receive an engagement instruction.

As noted in FIG. 10, and the embodiments herein, alternative embodiments allow for the adaptive arrangement of the decorative communication transport module layout as generally noted in FIG. 1, with modification suitable for use in diverse requirements. For example decorative cover surfaces 18 may be generally linear or may contain top and bottom hollows and a communication pathway; and elongate housings 60 may operate as securing covers and be generally curved-planar or may include their own top and bottom hollows and communication pathways. All of these embodiments may adaptively receive a fixing system 19 that extends through or from one portion or another and allows for a positioning of a securing hole 52 in various locations. Additionally fixing system 19 may include a channel (a slot) along where normally hole 52 resides, so that any version of a decorative communication transport module may be vertically adjusted relative to a user's ear 70 and ear channel 71 for optimal use.

In the additional figures below, it will be understood that the present invention may be adaptively modified without departing from the scope and spirit of the present invention.

Figure 13:
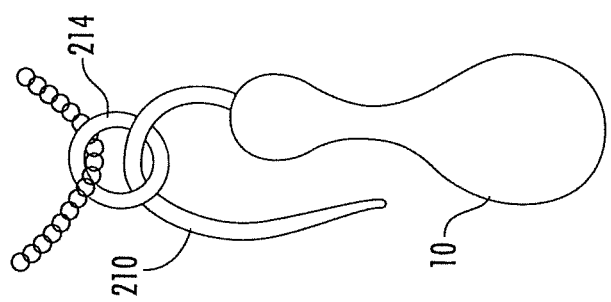
FIG. 13 is an illustrative view of a decorative communication transport module secured to a necklace in a lavalier style.
Figure 12:
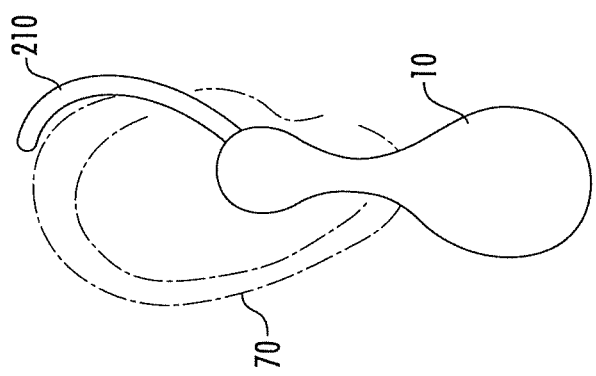
FIG. 12 is an illustrative view of a decorative communication transport module fixed to a user's ear with a fixing member.
Figure 11:
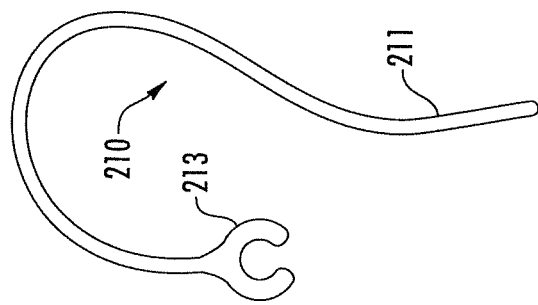
FIG. 11 is an illustration of an alternative fixing member.

Referring now to FIG. 11, an ear hoop 210 is provided with a spring arm portion 210 and a grasping hook portion 213. Ear hoop 210 is formed of a spring member either of plastic, elastomeric material, or metal and is in a spring form as will be discussed. As shown in FIG. 12, an exemplary decorative communication transport module 10 is secured via grasping hook 213 to ear hoop 210 and looped over ear 70. In this manner the present invention can replace a version of fixing system 19 with the ear hoop 210 for increased convenience. Additionally, and alternatively, in FIG. 13, ear hoop 210 may be secured via a necklace 214 in a type of lavalier style support for convenience, all while continuing to function or between uses.

Figure 14:
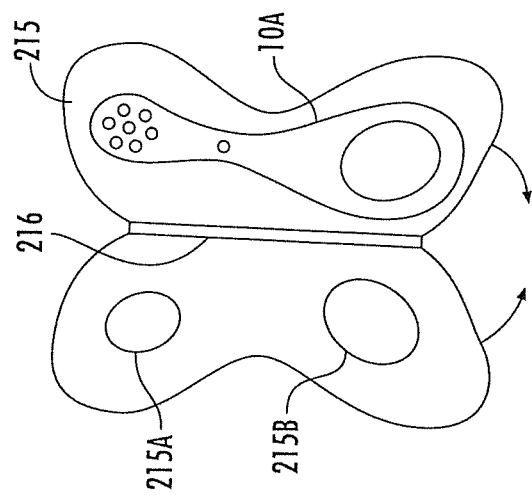
FIG. 14 is an assembled kit version of a carrying case with a decorative communication transport module secured therein.

As noted in FIG. 14, a case 215 is formed for securing a decorative communication transport module 10A (version) with opposing depressions 215A, 215B for receiving top and bottom hollow container portions 15A, 16A, and may be closed via a hinged portion 216 for convenient transport.

Figure 17:
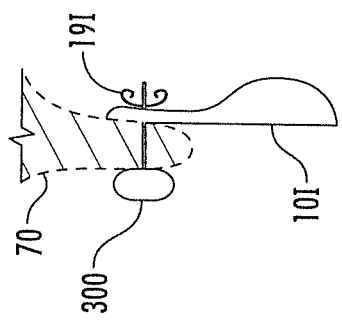
FIG. 17 provides an alternative embodiment of a decorative communication transport module in use with a conventional earring affixed to a user's ear.
Figure 16:
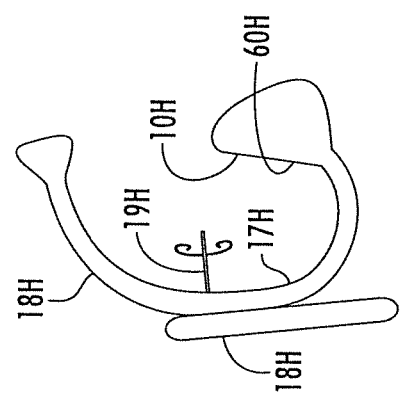
FIGS. 15 and 16 provide an alternative embodiment of a decorative communication transport module having a curved form.
Figure 15:
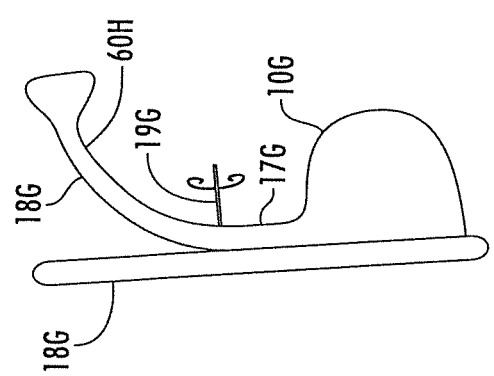

As noted in FIGS. 16 and 17, an adaptive decorative communication transport module 10G or 10H are provided with fixing systems 19G, 19H as discussed herein and respective decorative cover surfaces 18G, 18H. As will be noted elongate housings 60G, 60H and respective decorative cover surfaces 18G, 18H, and communication pathways 17G, 17H are curved to a small degree (FIG. 15) or a greater degree (FIG. 16). In this manner it is recognized that the proposed decorative communication transport module may be curved to adapt to user's ear-structures. Additionally, as noted in the current technology, the materials for construction of the proposed invention may allow for bendable material so that a live-action-bending process may occur to a user's preference.

As noted in FIG. 17 an alternative embodiment is provided wherein a conventional decorative earring 300 is provided on an outside portion of an ear, and an alternative version of the decorative communication transport module 101 is provided with a fixing system 191 to secure the same on an inner portion of an ear.

Figure 18:
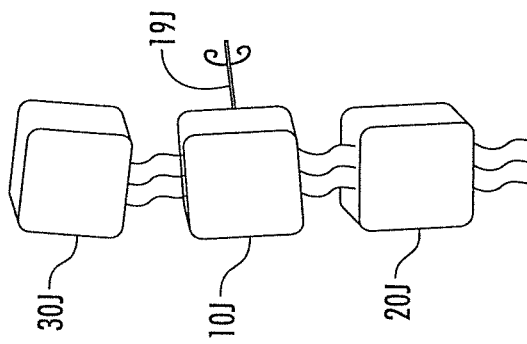
FIG. 18 provides an alternative embodiment of a decorative communication transport module formed in a dangling-loosely-connected form.

As noted in FIG. 18, a still further embodiment is noted as a decorative communication transport module 10J with flexibly secured speaker module 30J and electronic circuit module 20J with a positioned fixing system 19J, so that those of skill in the art will understand that components as discussed herein may be flexibly joined without departing from the scope and spirit of the present invention.

It will be understood that decorative cover surfaces 18 may be provided in a variety of alternative styles in a component packaging manner allowing users to select a desired decorative style from a plurality in a kit, assemble the decorative communication transport module to a liking, and to adapt the same after a use to employ a different style or shape within the scope and spirit of the present invention.

It will also be understood, that the use of the activation button(s) herein is exemplary of an activation device or system. As a result, the proposed invention will be understood to be additionally activatable by a tap-activated circuit (e.g., an accelerometer circuit), such that a single-tap or double-tap would be understood by associated programming circuits to activate the device, answer a call, select an option in a displayed menu, etc. Additionally, with the use of a swipe-screen circuit (as is used to active a touch screen display device, could be used to activate the device. Finally, it will be additionally understood that the proposed invention may include a passive or active 'listening' circuit such that the device is capable of actuation (on/off, menu-selection, etc.) via voice command. As a result, it will be understood that the phrase "button" as used herein equates with any mechanism, system, or circuit that will act in an operational manner to accept/reject calls, change a menu selection on a remote screen, initiate a call, etc. as would be understood by those of skill in the art.

It will be additionally understood that the phrases BLUETOOTH® wireless connectivity protocol is non-limiting and is representative of any combination of circuit hardware and software that enables a wireless communication with a hand-held unit (smart phone) and the proposed 'smart' earrings to enable the operating noted herein. Therefore, while BLUETOOTH® is a trademark, as used herein it is representative of a variety of diverse and standards-related technologies that allow recognition between devices, data transfer between devices, and operational circuit controls relative to multiple devices without interference. There are additionally various standards for such connectivity related to uses, including without limitation infrared communication, 802.11/WiFi, ZigBee, and BLUETOOTH standards.

As used herein it will be understood that the decorative elements can vary from relatively simple costume jewelry, involving non-precious metals or other media such as leather, plastic, resin, etc. to high-end jewelry with gemstones and precious metals. The manufacture of the decorative elements can be performed using a variety of techniques, ranging from an automated assembly line to hand-crafting of individual pieces. Additionally, the decorative elements may include indicia such as lighting, trademarks and branding, and other features common in decoration.

It will be additionally understood that the modules of this invention can also be used in conjunction with the wearer's own earrings, such that a user would attach the module to the back of her own earrings using the same securing features or post provided on the jewelry item itself. In this use, depending on the structure of the wearer's earrings, and the length of the securing-post or other means to attach, the module may or may not be visible. So it might be necessary that for such use, the module be made either substantially attractive or inconspicuous.

As used herein the microphone or power charging circuit and use may be of any type known or developed for similar function. A variety of microphone types include fiber-optic microphones, gel-based microphones, and other high-technology microphones. Power supplying circuits may include USB or induction coil types or even motion-energy storing devices.

Finally, as used herein the phrase circuit 'board' or 'printed circuit board' (PCB), is merely illustrative of a complex circuit arrangement, which may contain various circuit components and may be rigid in form, flexible in form (flexible-printed-circuit (FPC)), or even printed directly integrated with the device structure a type of integrated-printed-circuit (IPC). So that the circuit board as used herein will represent one and several circuit sufficient to operate the proposed invention as discussed.

Lastly, it will be understood that the operational software and circuits in any remote unit as disclosed herein (e.g., hand held unit) may optionally enable and contain circuitry and software sufficient to enable a plurality of options (calendar, text, email, volume, brightness, call features, etc.) within the scope of those technologies know from the conventional hand-held-cellular device.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A wireless communication device that is capable of being fixed to a decorative piece, comprising:
   a housing body comprising a first shell piece and a second piece, wherein the first shell piece and the second shell piece, when coupled together, define a first space volume, a second space volume, and a pathway connecting the first space volume and the second space volume;
   a speaker circuit arranged in the first space volume;
   an electronic circuit arranged in the second space volume, wherein the electronic circuit is electrically connected to the speaker circuit; and
   an activation circuit electrically connected to the electronic circuit, wherein an activation of the activation circuit operatively connects the speaker circuit with the electronic circuit.

2. The wireless communication device according to claim 1, wherein the first shell piece comprises a first curved surface, and the second shell piece comprises one of a substantially flat surface or a second curved surface, and wherein the second shell piece, when coupled to the first shell piece, extends from the first space volume to the second space volume along the pathway so as to conceal the first space volume and the second space volume.

3. The wireless communication device according to claim 1, wherein the first shell piece comprises a first fixation hole, and the second shell piece comprises a second fixation hole that is in alignment with the first fixation hole in such a manner that the alignment allows insertion of a fixation post passing through the first and the second fixation holes.

4. The wireless communication device according to claim 3, wherein the wireless communication device is fixed to the decorative piece by the fixation post that is coupled to the decorative piece and passes through the first fixation hole and the second fixation hole.

5. The wireless communication device according to claim 3, wherein the decorative piece is any one of a plurality of earrings that are wearable by a user.

6. The wireless communication device according to 3, wherein the fixation post is one of a separate part from or an integral part of the decorative piece.

7. The wireless communication device according to 3, wherein when the wireless communication device is fixed to the decorative piece by the fixation post, the decorative piece blocks an observer from viewing the wireless communication device.

8. The wireless communication device according to claim 1, wherein the first fixation hole and the second fixation hole are arranged in the first shell piece and the second shell piece at locations correspondingly enclosing the pathway.

9. The wireless communication device according to claim 1, further comprising an electronic wire passing through the pathway to electrically connect the electronic circuit and the speaker circuit.

10. The wireless communication device according to claim 1, wherein the wireless communication device is fixed to the decorative piece by a fixation system.

11. The wireless communication device according to claim 10, wherein the fixing system extends from the first shell piece to the second shell piece.

12. The wireless communication device according to claim 11, wherein the fixing system further comprises an adjustment system operable to adjustably reposition a projecting elongate post to a plurality of positions between the first space volume and the second space volume.

13. The wireless communication device according to claim 1, wherein the second shell piece comprises a plurality of projecting securing members projecting therefrom, the first shell piece comprises a plurality of engagement members shaped to communicate with respective ones of the projecting securing members, wherein during an assembly of the housing body of the wireless communication device, the second shell piece is securely engageable with the first shell piece, thereby securing the speaker circuit within the first space volume and the electronic circuit within the second space volume.

14. The wireless communication device according to claim 1, wherein said electronic circuit further comprises:
a rechargeable power supply, a data and charging port, a microphone circuit, a wireless transmitter circuit; and
said activation circuit including an activation trigger.

15. A wireless communication device, comprising:
a housing body comprising a first shell piece and a second shell piece, wherein the first shell piece and the second shell piece when coupled together define a first space volume, a second space volume, and a pathway connecting the first space volume and the second space volume, and wherein the second shell piece comprises a decorative surface facing away from the first shell piece;
a speaker circuit arranged in the first space volume;
an electronic circuit arranged in the second space volume, wherein the electronic circuit is electrically connected to the speaker circuit; and
an activation circuit electrically connected to the electronic circuit, wherein an activation of the activation circuit operatively connects the speaker circuit with the electronic circuit.

16. The wireless communication system according to claim 15, wherein the first shell piece comprises a first curved surface, and the second shell piece comprises one of a substantially flat surface or a second curved surface, wherein an outer surface of the second shell piece is the decorative surface, and wherein the second shell piece when coupled to the first shell piece extends from the first space volume to the second space volume along the pathway so as to conceal the first space volume and the second space volume.

17. The wireless communication device according to claim 15, wherein the first shell piece comprises a hole, and the second shell piece is affixed with a fixation post that is in alignment with the hole in such a manner that the alignment allows a free end of the fixation post passing through the hole, and wherein the free end of the fixation post is to be coupled to a post hook so that the wireless communication device is worn by a user.

18. The wireless communication system according to claim 15, further comprising an electronic wire passing through the pathway to electrically connect the electronic circuit and the speaker circuit.

19. The wireless communication device according to claim 15, wherein said electronic circuit further comprises:
a rechargeable power supply, a data and charging port, a microphone circuit, a wireless transmitter circuit; and
said activation circuit including an activation trigger.

* * * * *